United States Patent
Fukunaga et al.

(10) Patent No.: US 8,502,002 B2
(45) Date of Patent: Aug. 6, 2013

(54) MICROSCOPE IMMERSION OIL

(75) Inventors: Yuichi Fukunaga, Chiba (JP); Toyozo Fujioka, Chiba (JP); Toshihiro Mine, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 127 days.

(21) Appl. No.: 12/376,293

(22) PCT Filed: Jul. 26, 2007

(86) PCT No.: PCT/JP2007/064692
§ 371 (c)(1),
(2), (4) Date: Feb. 4, 2009

(87) PCT Pub. No.: WO2008/015960
PCT Pub. Date: Feb. 7, 2008

(65) Prior Publication Data
US 2010/0224833 A1  Sep. 9, 2010

(30) Foreign Application Priority Data
Aug. 4, 2006 (JP) ................................. 2006-213339

(51) Int. Cl.
*G02B 21/33* (2006.01)
*G01N 21/64* (2006.01)

(52) U.S. Cl.
USPC ............ 585/12; 585/24; 585/25; 252/301.35; 252/582

(58) Field of Classification Search
USPC ........................................ 585/12; 252/301.35
See application file for complete search history.

(56) References Cited

U.S. PATENT DOCUMENTS

| | | | | |
|---|---|---|---|---|
| 3,979,301 A | * | 9/1976 | Ushioda et al. | 252/408.1 |
| 4,465,621 A | | 8/1984 | Sacher | |
| 4,559,147 A | * | 12/1985 | Hirth et al. | 252/1 |
| 4,587,042 A | * | 5/1986 | Liva | 252/582 |
| 4,789,490 A | * | 12/1988 | Tanaka | 252/408.1 |
| 4,832,855 A | * | 5/1989 | Tanaka | 252/1 |
| 5,817,256 A | | 10/1998 | Weippert | |
| 6,221,281 B1 | * | 4/2001 | Motoyama | 252/408.1 |
| 2006/0237698 A1 | | 10/2006 | Fukunaga et al. | |

FOREIGN PATENT DOCUMENTS

| | | |
|---|---|---|
| JP | 51 97646 | 8/1976 |
| JP | 62 094813 | 5/1987 |
| JP | 63 118118 | 5/1988 |
| JP | 2 084448 | 3/1990 |
| JP | 06 167653 | 6/1994 |
| JP | 09 241214 | 9/1997 |
| JP | 11 160623 | 6/1999 |
| JP | 11 269317 | 10/1999 |
| JP | 2002 053839 | 2/2002 |
| JP | 2004 240245 | 8/2004 |
| JP | 2004 240246 | 8/2004 |
| WO | 2004 090602 | 10/2004 |

OTHER PUBLICATIONS

Extended European Search Report issued Nov. 5, 2010, in Patent Application No. 07791392.9.

* cited by examiner

*Primary Examiner* — Ellen McAvoy
(74) *Attorney, Agent, or Firm* — Oblon, Spivak, McClelland, Maier & Neustadt, L.L.P.

(57) ABSTRACT

Provided is an immersion oil for microscope including a liquid olefin polymer (A), a liquid diene polymer (B), a diaryl alkane (C), and an alkyl benzene (D), the immersion oil for microscope being capable of maintaining low fluorescence of its own over a long period of time, having good characteristics required for an immersion oil for microscope, such as good refractive index, Abbe number, viscosity, and resolution, and being particularly suitable as an immersion oil for a fluorescence microscope.

23 Claims, No Drawings

MICROSCOPE IMMERSION OIL

Cross-Reference to Related Applications

The present application is a 35 U.S.C. §371 National Stage patent application of International patent application PCT/JP07/64692, filed on Jul. 26, 2007, which claims priority to German patent application 2006-213339, filed on Aug. 4, 2006.

TECHNICAL FIELD

The present invention relates to an immersion oil for microscope, and more specifically, to an immersion oil which is capable of maintaining low fluorescence over a long period of time and is particularly suitable for a fluorescence microscope.

BACKGROUND ART

Conventionally, there has been very generally used an immersion oil in a microscope field. When the immersion oil is optically used, compared with the case where the immersion oil is not used, a substantially small surface aberration can be obtained, and in addition, the immersion oil increases numerical aperture of objective lens and enhances magnifying power of a microscope.

As the immersion oil used in the above case, there are known: an immersion oil (e.g., refer to Patent Document 1) formed of a diarylalkane compound, a specific naphthalene compound, and a specific diphenyl compound; an immersion oil (e.g., refer to Patent Document 2) formed of benzylbutylphthalate and a chlorinated paraffin; an immersion oil for microscope (e.g., refer to Patent Document 3) containing a tricyclodecane derivative or containing, as a main component, a derivative of a substance having a basic structure of tricyclodecane; an immersion oil for microscope (e.g., refer to Patent Document 4) in which a liquid polybutene (liquid polybutylene) is compounded with a liquid aromatic compound having an ether bond; an immersion oil (e.g., refer to Patent Document 5) formed by compounding an aromatic compound into a liquid polyolefin; an immersion oil for microscope (e.g., refer to Patent Document 6) containing and/or hydrogenated product of a monomer to a tetramer of norbornenes; an immersion oil for microscope (e.g., refer to Patent Document 7) in which a liquid diene copolymer is compounded with phthalate and paraffins; and an immersion oil for microscope (e.g., refer to Patent Document 8) in which a liquid diene copolymer is compounded with α-olefin.

The immersion oils have approximately sufficient characteristics required for an immersion oil for microscope, such as refractive index, Abbe number, viscosity, and resolution. However, the immersion oils are not sufficient in terms of persistence of low fluorescence at the time of determination by, for example, a spectrophotometer.

In general, a fluorescence microscope used for observing an object emitting fluorescence and the like is a microscope which is used for observing fluorescence emitted from a test body by irradiating the test body with excitation light such as UV light, and the fluorescence microscope has been utilized in various fields such as biology. In particular, a technology of a fluorescence microscope which detects an extremely weak fluorescence is being studied recently. In the case of detecting such a weak fluorescence, a high fluorescence, which is emitted from an immersion oil used for an optical system of a fluorescence microscope under UV light excitation, causes a noise when detected, whereby detection accuracy of the weak fluorescence becomes low. Studies of improving the immersion oil have been conducted relating to the above point, but further lower fluorescence and stable low fluorescence of the immersion oil have been demanded nowadays as described above, and the studies have not satisfied needs thereof yet.

Patent Document 1: JP 2623125 B
Patent Document 2: U.S. Pat. No. 4,465,621
Patent Document 3: JP 09-241214 A
Patent Document 4: JP 11-160623 A
Patent Document 5: JP 11-269317 A
Patent Document 6: WO 2004/090602
Patent Document 7: JP 2004-240245 A
Patent Document 8: JP 2004-240246 A

DISCLOSURE OF THE INVENTION

Problems to be Solved by the Invention

It is an object of the present invention to provide an immersion oil for microscope which solves the above-mentioned problems, has low fluorescence of its own under UV light excitation, is excellent in persistence of low fluorescence, has other good characteristics required for an immersion oil for microscope, such as good refractive index, Abbe number, viscosity, and resolution, and is particularly suitable as an immersion oil for a fluorescence microscope.

Means for Solving the Problems

The inventors of the present invention have intensively studied in view of the above-mentioned circumstances to develop an immersion oil for microscope having low fluorescence, being capable of maintaining the low fluorescence over a long period of time, and being excellent in other characteristics. As a result, the inventors have found that the object can be accomplished by compounding a liquid olefin polymer, a specific liquid diene polymer, a diaryl alkane, and an alkyl benzene to an immersion oil for microscope. The present invention has been completed based on the above finding.

That is, the present invention provides:

(1) an immersion oil for microscope including a liquid olefin polymer (A), a liquid diene polymer (B), a diaryl alkane (C), and an alkyl benzene (D);

(2) the immersion oil for microscope according to the item (1), in which the liquid olefin polymer (A) is a polybutene;

(3) the immersion oil for microscope according to the item (1) or (2), in which the liquid olefin polymer (A) has a number average molecular weight of 300 to 25,000;

(4) the immersion oil for microscope according to the item (1) or (2), in which the liquid diene polymer (B) is a polyisoprene;

(5) the immersion oil for microscope according to the item (1) or (2), in which the liquid diene polymer (B) has a number average molecular weight of 1,000 to 100,000;

(6) the immersion oil for microscope according to the item (1) or (2), in which the diaryl alkane (C) is phenylxylylethane and/or phenylethylphenylethane;

(7) the immersion oil for microscope according to the item (1) or (2), in which the alkyl benzene (D) is 1,3,5-triisopropylbenzene;

(8) the immersion oil for microscope according to the item (1) or (2), in which the immersion oil for microscope has a fluorescence intensity which is twice or less an initial value thereof when heated at 50° C. for 8 weeks; and (9) the immersion oil for microscope according to the item (1), in which the liquid olefin polymer (A) includes polybutene, the liquid diene polymer (B) includes polyisoprene, the diaryl alkane (C) includes phenylxylylethane and/or phenylethylphenylethane, and the alkyl benzene (D) includes 1,3,5-triisopropylbenzene.

Effects of the Invention

The immersion oil for microscope of the present invention has low fluorescence and good storage stability, and therefore, low fluorescence thereof is retained over a long period of time, while other characteristics required for an immersion oil are highly maintained, such as refractive index, Abbe number, viscosity, and resolution. Thus, the immersion oil for microscope of the present invention is remarkably excellent particularly as an immersion oil for a fluorescence microscope.

BEST MODE FOR CARRYING OUT THE INVENTION

Hereinafter, the present invention is described in detail.

An immersion oil for microscope of the present invention includes a liquid olefin polymer (A), a liquid diene polymer (B), a diaryl alkane (C), and an alkyl benzene (D).

As the olefin polymer serving as a component (A) used in the present invention, there is no particular limitation, and liquid olefin polymers each having a number average molecular weight of preferably 300 to 25,000 and more preferably 500 to 5,000 are used. Examples of the liquid olefin polymers include polyethylene, polypropylene, polybutene, and polyisobutylene. It is to be noted that the liquid olefin polymers may be used in the form of one kind thereof alone, a blended product of two or more kinds thereof, or a copolymer thereof.

As the liquid diene polymer serving as a component (B) used in the present invention, there is no particular limitation, and liquid diene polymers each having a number average molecular weight of 1,000 to 100,000 and preferably 1,000 to 80,000 are used.

As the liquid diene polymers, there are given diene homopolymers and diene copolymers each formed of a diene monomer having 4 to 12 carbon atoms, copolymers each formed of the diene monomer and an α-olefin addition polymerizable monomer having 2 to 22 carbon atoms, and the like. Example of the polymers includes butadiene homopolymers (a liquid polybutadiene, a hydroxy group-containing liquid polybutadiene), an isoprene homopolymer (a hydroxy group-containing liquid polyisoprene), a chloroprene homopolymer, a butadiene-isoprene copolymer, a butadiene-acrylonitrile copolymer, and a butadiene-2-hexylacrylate copolymer.

Preferred liquid diene polymers are butadiene homopolymers such as a liquid polybutadiene and a hydroxy group-containing liquid polybutadiene, isoprene homopolymers such as a hydroxy group-containing liquid polyisoprene, and a copolymer formed of polybutene and polyisoprene.

The liquid diene polymer may have a functional group such as a hydroxyl group in a molecule and/or at a terminal of a molecule, or may be a mixture of the liquid diene polymer having a functional group with a liquid diene polymer not having a functional group. It is to be noted that one kind of the liquid diene polymer may be used alone, or two or more kinds thereof may be used in combination.

It is to be noted that the number average molecular weight of each of the liquid olefin polymer serving as the component (A) and the liquid diene polymer serving as the component (B) is a value based on a polystyrene, which is determined by a gel permeation chromatography (GPC) method.

The diaryl alkane serving as a component (C) used in the present invention is not particularly limited as long as it is a diaryl alkane which is liquid at ordinary temperatures and pressures or is a mixed diaryl alkane which is liquid at ordinary temperatures and pressures.

Examples of the diarylalkane include diphenyl methane, dibenzyl toluene, benzyl xylene, phenyl-sec-butyl phenyl methane, di-sec-butyl diphenyl methane, diphenyl ethane, phenylethyl phenyl ethane, phenylcumyl ethane, diisopropylphenyl ethane, phenyltolyl ethane, di-sec-butylphenyl ethane, di-tert-butyl phenyl ethane, phenylxylyl ethane, phenyl-sec-butylphenyl ethane, diphenyl propane, diphenyl butane, ditolyl ethane, dixylyl octane, and dixylyl decane. Of those, phenylethyl phenyl ethane and phenylxyly ethane are preferred.

Examples of the phenylethyl phenyl ethane include 1-phenyl-1-(2-ethylphenyl)ethane, 1-phenyl-1-(3-ethylphenyl)ethane, 1-phenyl-1-(4-ethylphenyl)ethane, and 1-phenyl-2-(2-ethylphenyl)ethane.

Examples of the phenylxylyl ethane include 1-phenyl-1-(2,3-dimethylphenyl)ethane, 1-phenyl-1-(2,4-dimethylphenyl) ethane, 1-phenyl-1-(2,5-dimethylphenyl)ethane, 1-phenyl-1-(2,6-dimethylphenyl)ethane, 1-phenyl-1-(3,4-dimethylphenyl)ethane, 1-phenyl-1-(3,5-dimethylphenyl)ethane, and 1-phenyl-2-(2,3-dimethylphenyl)ethane.

It is to be noted that one kind of the diaryl alkane may be used alone or two or more kinds thereof may be used as a mixture, as long as the diaryl alkanes are liquid at ordinary temperatures and pressures.

There is no particular limitation for the alkyl benzene serving as a component (D) used in the present invention, and as the alkyl group of the alkyl benzene, the alkyl groups having 1-4 carbon atoms such as a methyl group, an ethyl group, an isopropyl group, and a butyl group can be generally exemplified.

Specific examples include ethyl benzenes such as monoethyl benzene, diethyl benzene, triethyl benzene, and tetraethylbenzene, isopropyl benzenes such as monoisopropyl benzene, diisopropyl benzene, and triisopropyl benzene, isopropyl toluenes such as monoisopropyl toluene, diisopropyl toluene, and triisopropyl toluene.

Of those, 1,3,5-triisopropyl benzene, triethyl benzene, and triisopropyl toluene are preferred.

In the immersion oil for microscope of the present invention, a compounding ratio among the liquid olefin polymer serving as the component (A), the liquid diene copolymer serving as the component (B), the diaryl alkane serving as the component (C), and the alkyl benzene serving as the component (D) can be appropriately set, and a preferable compounding ratio by mass is 1 to 30 parts by mass of the component (B), 40 to 80 parts by mass of the component (C), and 2 to 30 parts by mass of the component (D) with respect to 100 parts by mass of the component (A). A more preferable compounding ratio is 2 to 20 parts by mass of the component (B), 50 to 70 parts by mass of the component (C), and 5 to 25 parts by mass of the component (D) with respect to 100 parts by mass of the component (A).

When the compounding ratio of the component (A), the component (B), the component (C), and the component (D) deviates from the above range, there are cases where the fluorescence of the immersion oil to be obtained becomes high and refractive index, Abbe number, dynamic viscosity, transparency, chromaticity, and other characteristics become insufficient.

Examples of the other characteristics required for the immersion oil include non-dryness, external appearance, weatherability, corrosion resistance, contrast, resolution, color aberration, and transparency or the like.

By setting the compounding ratio to the above, an immersion oil is formed, which has low fluorescence, can maintain the low fluorescence over a long period of time, and is also excellent in other characteristics.

Further, an order of compounding the component (A), the component (B), the component (C), and the component (D) is not particularly limited, and they may be compounded in various orders such as simultaneously and in a step-by-step manner.

Further, a compounding method is also not particularly limited, and in general, a compounding method performed by mixing while stirring at ordinary temperatures is preferably employed.

In the immersion oil for microscope of the present invention, an additive and a compounding agent, which are used for an ordinary immersion oil for microscope such as a fluorescence immersion oil for microscope, can be used, as long as an original effect as the immersion oil is not adversely affected.

Thus obtained immersion oil for microscope of the present invention can be suitably used as an immersion oil for an ordinary microscope, and in particular, an immersion oil for a fluorescence microscope.

In the present invention, an immersion oil for microscope which is particularly excellent in the required characteristics is provided, when the immersion oil for microscope has the combination in which the component (A) is polybutene, the component (B) is polyisoprene, the component (C) is phenylxylylethane and/or phenylethylphenylethane, and the component (D) is 1,3,5-triisopropylbenzene.

EXAMPLES

Hereinafter, the present invention is described in more detail by way of examples and comparative examples, but is not limited thereto.

It is to be noted that evaluations of the various characteristics of the immersion oil for microscope were performed by using the following methods.
(1) Low Fluorescence In a fluorescence microscope, a xenon lamp, which emits UV light exciting fluorescence, was used as a light source. As the excitation light in this case, there are used U excitation, B excitation, and G excitation based on length of the wavelength. In each of the excitation, an immersion oil having small amount of fluorescence generation is desirable for the fluorescence microscope (determined by Spectrofluorometer F-2500 manufactured by Hitachi, Ltd.).

It is to be noted that variation with time of the low fluorescence was found by determining a sample obtained by charging 30 g of a test sample in a glass bottle and heating the test sample at 50° C. for 8 weeks.
(2) Refractive Index (n23D) and Abbe Number (ν23D)

The refractive index and the Abbe number were determined in accordance with JIS K 2101. A preferred range of the refractive index as an immersion oil for microscope is 1.5140 to 1.5160, and a preferred range of the Abbe number as an immersion oil for microscope is 38 to 44.
(3) Dynamic Viscosity The dynamic viscosity was determined in accordance with JIS K 2283. A preferred range of the dynamic viscosity as an immersion oil for microscope is 100 to 1,000 mm$^2$/second (25° C.).

(4) Non-Dryness

The non-dryness was determined by performing a test at 30° C. for 24 hours in accordance with JIS C 2201 Test of evaporation amount of "electrical insulating oils", and was evaluated based on the following two levels.
 Good (○): evaporation amount of less than 1% by mass
 Poor (x): evaporation amount of 1% by mass or more
(5) External Appearance The test sample was placed on a clean glass container, and presence or absence of cloudiness was confirmed.
 Cloudiness is absent: (○)
 Cloudiness is slightly present: (Δ)
(6) Weatherability The weatherability was evaluated based on the following two levels from the results of a light irradiation test and a heat deterioration test, which are the evaluating methods described in the items (7) and (8) described below, and from the changes of the refractive index, the Abbe number, and a color hue before and after the tests.
 Good (○): No change is observed in all of refractive index, Abbe number, and color hue.
 Poor (x): Change is observed in any one of refractive index, Abbe number, and color hue.
(7) Light Irradiation Test A predetermined amount (40±0.5 g) of the test sample was placed on a dish, and a change in the refractive index after light irradiation for a predetermined period of time (24, 72, and 120 hours) was determined. The case where there was no change was evaluated as good (○).
(8) Test of Deterioration Promoted by Heating (Storage Stability Test)

A predetermined amount (40±0.5 g) of the test sample was placed in a 50-ml Erlenmeyer flask with stopper, retained in a thermostat maintained at a predetermined temperature (40, 70° C.) for 24 hours, and was thereafter observed for changes in the refractive index, the Abbe number, and the color hue. The case where there was no change was evaluated as good (○).
(9) Corrosion Resistance Presence or absence of corrosiveness was examined by determining Total acid number (JIS K 2501) and affection on dye for smear (JIS K 2400). The case where corrosion was absent was evaluated as (○) and the case where corrosion was present was evaluated as (x).
(10) Contrast In a microscope using the immersion oil, the contrast was evaluated based on the following two levels by observing black and white lines carved on a chromium-deposited black and white plate.
 Good (○): clear
 Poor (x): little blurred
(11) Resolution The resolution was evaluated based on the following two levels by determining the refractive index.
 Good (○): 1.5140 to 1.5160
 Poor (x): out of the above range
(12) Color Aberration The color aberration was evaluated based on the following two levels by determining the Abbe number.
 Good (○): 38 to 44
 Poor (x): out of the above range
(13) Transparency The transparency was evaluated based on the following two levels in accordance with Transmittance (JIS K 0115).
 Good (○): 95% or more
 Poor (x): less than 95%

Examples 1 to 3 and Comparative Examples 1 and 2

Respective components shown in Table 1 are each compounded in the stated amount and mixed while stirring at 25° C. for 10 minutes, whereby immersion oil for microscopes were prepared. Tests were performed for the immersion oils by the above-mentioned evaluation methods. The evaluation results are shown in Table 1.

In Table 1, the mark "○" in the evaluation column represents "good" or "favorable", and the mark "x" represents "poor" or "unfavorable". It is to be noted that: in the evaluation of the low fluorescence, the mark "○" shows that the fluorescence is low, and the mark "Δ" shows that the fluorescence is slightly high; and, in the evaluation of the external appearance, the mark "○" shows that the cloudiness is absent, and the mark "Δ" shows that the cloudiness is slightly present.

Further, fluorescence intensities (relative intensities) of the respective excitation lights are shown in Table 2. The relative intensities were calculated under the condition that a fluorescence intensity of each of U excitation, B excitation, and G excitation immediately after the production of Example 1 was 1.0.

TABLE 2

| Heating Conditions | Excitation lights | Example 1 | Example 2 | Example 3 | Comparative Example 1 | Comparative Example 2 |
|---|---|---|---|---|---|---|
| None | U | 1.0 | 1.0 | 1.0 | 3.1 | 0.9 |
|  | B | 1.0 | 1.0 | 1.0 | 3.3 | 0.9 |
|  | G | 1.0 | 1.0 | 1.0 | 1.9 | 0.7 |
| 50° C. × 8 weeks | U | 1.2 | 1.4 | 1.2 | 18 | 17 |
|  | B | 1.2 | 1.3 | 1.1 | 10 | 1.9 |
|  | G | 1.0 | 1.0 | 1.0 | 3.2 | 0.9 |

From the results of Table 1 and Table 2, it is clear that the immersion oil for microscope sufficiently maintain the characteristics required for an immersion oil for microscope, the low fluorescence of the immersion oil for microscope is improved, and persistence of the low fluorescence is excellent.

Industrial Applicability

The immersion oil for microscope of the present invention can be suitably used particularly for a fluorescence microscope.

TABLE 1

| Names of respective components | Names of compounds | Example 1 | Example 2 | Example 3 | Comparative Example 1 | Comparative Example 2 |
|---|---|---|---|---|---|---|
| Compounding amount (parts by mass) | | | | | | |
| Liquid olefin polymer | Polybutene *1 | 100 | 100 | 100 | — | 100 |
|  | Polybutene *2 | — | — | — | 100 | — |
| Liquid diene polymer | Polyisoprene *3 | 18 | 5 | 12 | — | — |
| Diaryl alkane | 1-phenyl-1-(3,4-dimenthylphenyl)ethane | — | 30 | 64 | 60 | 64 |
|  | 1-phenyl-1-(4-ethylphenyl)ethane | 55 | 29 | — | — | — |
| Alkyl benzene | 1,3,5-triisopropylbenzene | 6 | 11 | 18 | — | 18 |
| Characteristics of immersion oil for microscope | Evaluation items | | | | | |
|  | Refractive index | 1.515 | 1.515 | 1.515 | 1.515 | 1.515 |
|  | Abbe number | 41 | 41 | 41 | 43 | 41 |
|  | Dynamic viscosity | 450 | 450 | 450 | 260 | 250 |
|  | Low fluorescence | ○ | ○ | ○ | Δ | ○ |
|  | Fluorescence intensity variation with time (U excitation) | 1.2 | 1.4 | 1.2 | 18 | 17 |
|  | Non-dryness | ○ | ○ | ○ | ○ | ○ |
|  | External appearance | ○ | ○ | ○ | ○ | ○ |
|  | Weatherability | ○ | ○ | ○ | ○ | ○ |
|  | Corrosion resistance | ○ | ○ | ○ | ○ | ○ |
|  | Contrast | ○ | ○ | ○ | ○ | ○ |
|  | Resolution | ○ | ○ | ○ | ○ | ○ |
|  | Color aberration | ○ | ○ | ○ | ○ | ○ |
|  | Transparency | ○ | ○ | ○ | ○ | ○ |

*1 Idemitsu polybutene 100R (manufactured by Idemitsu Kosan Co., Ltd.)
*2 Idemitsu polybutene 35R (manufactured by Idemitsu Kosan Co., Ltd.)
*3 LIR-30 (manufactured by Kuraray Co., Ltd.)

*1: liquid olefin polymer manufactured by Idemitsu Kosan Co., Ltd. [trade name "Polybutene 100R", a number average molecular weight of 960]

*2: liquid olefin polymer manufactured by Idemitsu Kosan Co., Ltd. [trade name "Polybutene 35R", a number average molecular weight of 720]

*3: liquid diene polymer manufactured by Kuraray Co., Ltd. [trade name "LIR-30", a number average molecular weight of 29,000]

The invention claimed is:

1. An immersion oil, comprising:
a liquid olefin polymer (A);
a liquid diene polymer (B) in an amount of 1 to 30 parts by mass with respect to 100 parts by mass of the liquid olefin polymer (A);
a diaryl alkane (C) in an amount of 40 to 80 parts by mass with respect to 100 parts by mass of the liquid olefin polymer (A); and an alkyl benzene (D) in an amount of 2 to 30 parts by mass with respect to 100 parts by mass of the liquid olefin polymer (A).

2. The immersion oil according to claim 1, wherein the liquid olefin polymer (A) is a polybutene.

3. The immersion oil according to claim 1, wherein the liquid olefin polymer (A) has a number average molecular weight of 300 to 25,000.

4. The immersion oil according to claim 1, wherein the liquid diene polymer (B) is a polyisoprene.

5. The immersion oil according to claim 1, wherein the liquid diene polymer (B) has a number average molecular weight of 1,000 to 100,000.

6. The immersion oil according to claim 1, wherein the diaryl alkane (C) comprises at least one of phenylxylylethane and phenylethylphenylethane.

7. The immersion oil according to claim 1, wherein the alkyl benzene (D) is 1,3,5-triisopropylbenzene.

8. The immersion oil according to claim 1, wherein the immersion oil has a fluorescence intensity which is twice or less an initial value thereof when heated at 50° C. for 8 weeks.

9. The immersion oil according to claim 1, wherein:
the liquid olefin polymer (A) is a polybutene;
the liquid diene polymer (B) is a polyisoprene;
the diaryl alkane (C) comprises at least one of phenylxylylethane and phenylethylphenylethane; and
the alkyl benzene (D) is 1,3,5-triisopropylbenzene.

10. The immersion oil according to claim 9, wherein the liquid diene polymer (B) is included in an amount of 2 to 20 parts by mass, the diaryl alkane (C) is included in an amount of 50 to 70 parts by mass, and the alkyl benzene (D) is included in an amount of 5 to 25 parts by mass, with respect to 100 parts by mass of the liquid olefin polymer (A).

11. The immersion oil according to claim 10, wherein the diaryl alkane (C) comprises phenylxylylethane and phenylethylphenylethane.

12. The immersion oil according to claim 1, wherein the liquid diene polymer (B) is included in an amount of 2 to 20 parts by mass, the diaryl alkane (C) is included in an amount of 50 to 70 parts by mass, the alkyl benzene (D) is included in an amount of 5 to 25 parts by mass, with respect to 100 parts by mass of the liquid olefin polymer (A), the liquid olefin polymer (A) is a polybutene, the liquid diene polymer (B) is a polyisoprene, the diaryl alkane (C) comprises at least one of 1-phenyl-1-(3,4-dimethylphenyl) ethane and 1-phenyl-1-(4-ethylphenyl) ethane, and the alkyl benzene (D) is 1,3,5-triisopropylbenzene.

13. The immersion oil according to claim 1, wherein the alkyl benzene (D) comprises at least one selected from the group consisting of an ethyl benzene, an isopropyl benzene and an isopropyl toluene.

14. The immersion oil according to claim 1, wherein the alkyl benzene (D) comprises at least one selected from the group consisting of 1,3,5-triisopropyl benzene, triethyl benzene and triisopropyl toluene.

15. The immersion oil according to claim 11, wherein the phenylxylylethane is 1-phenyl-1-(3,4-dimethylphenyl) ethane, and the phenylethylphenylethane is 1-phenyl-1-(4-ethylphenyl) ethane.

16. The immersion oil according to claim 15, wherein a refractive index is in a range of from 1.5140 to 1.5160, and an Abbe number is in a range of from 38 to 44.

17. The immersion oil according to claim 1, wherein a refractive index is in a range of from 1.5140 to 1.5160, and an Abbe number is in a range of from 38 to 44.

18. An immersion oil, consisting essentially of:
a liquid olefin polymer (A);
a liquid diene polymer (B);
a diaryl alkane (C); and
an alkyl benzene (D).

19. An immersion oil, consisting of:
a liquid olefin polymer (A);
a liquid diene polymer (B);
a diaryl alkane (C); and
an alkyl benzene (D).

20. A method of observing an object, comprising:
applying an immersion oil to an object that emits fluorescence; and
detecting the fluorescence,
wherein the immersion oil comprises a liquid olefin polymer (A), a liquid diene polymer (B), a diaryl alkane (C), and an alkyl benzene (D).

21. The method according to claim 20, wherein the immersion oil comprises the liquid diene polymer (B) in an amount of 1 to 30 parts by mass with respect to 100 parts by mass of the liquid olefin polymer (A), the diaryl alkane (C) in an amount of 40 to 80 parts by mass with respect to 100 parts by mass of the liquid olefin polymer (A), and the alkyl benzene (D) in an amount of 2 to 30 parts by mass with respect to 100 parts by mass of the liquid olefin polymer (A).

22. The method according to claim 21, wherein the liquid olefin polymer (A) is a polybutene, the liquid diene polymer (B) is a polyisoprene, the diaryl alkane (C) comprises at least one of 1-phenyl-1-(3,4-dimethylphenyl) ethane and 1-phenyl-1-(4-ethylphenyl) ethane, and the alkyl benzene (D) is 1,3,5-triisopropylbenzene.

23. The method according to claim 20, wherein the immersion oil has a refractive index in a range of from 1.5140 to 1.5160 and an Abbe number in a range of from 38 to 44.

* * * * *